Dec. 12, 1967 J. BEREZNAK 3,358,086

SUPERVISORY SIGNAL DETECTOR

Filed June 25, 1964 3 Sheets-Sheet 1

INVENTOR.
JOHN BEREZNAK
BY
Philip A. Weiss
ATTORNEY

Dec. 12, 1967 J. BEREZNAK 3,358,086

SUPERVISORY SIGNAL DETECTOR

Filed June 25, 1964 3 Sheets-Sheet 3

United States Patent Office 3,358,086
Patented Dec. 12, 1967

3,358,086

SUPERVISORY SIGNAL DETECTOR

John Bereznak, Oaklawn, Ill., assignor to International Telephone and Telegraph Corporation Filed June 25, 1964, Ser. No. 377,896
16 Claims. (Cl. 179—16)

ABSTRACT OF THE DISCLOSURE

An alternating current supervisory signalling circuit wherein the supervisory signals are recognized through phase and amplitude comparisons rather than through frequency filtering. Coincidence gates are used to eliminate tuned circuits, special guard and immunity circuits.

This invention relates to supervisory signalling circuits and more particularly, to detecting circuits used for detecting supervisory signals.

Supervisory signalling is normally accomplished over two leads that are known in the art as E and M leads. The M lead, for example, transmits the near-end supervisory signals to the distant end of the telecommunication system. The E lead, for example, receives the indication of the supervisory conditions at the far end. When the telecommunication system being supervised comprises balanced networks of mechanical switches, D.C. supervisory signalling can be used to indicate a supervised condition and the supervisory signals can travel over the voice channels. No special supervisory paths are required.

However, it is often preferable to use A.C. supervisory signals instead of the D.C. signals. For example, where the voice channels use unbalanced switching networks comprised of solid state devices, such as the type of switching network disclosed in U.S. Patent No. 3,201,520, entitled "Electronic Switching Telephone System," which issued on Aug. 17, 1965 and is assigned to the assignee of this invention, it is necesary to use A.C. supervisory signalling.

In known A.C. superivsory signalling systems tones are gated on the voice channels and special filter equipped tone detectors are used at the called line. The tone detectors previously used have been relatively expensive, requiring tuned circuits. In addition, special guard and speech immunity circuits have been required when the supervisory signals have been in the voice frequency range.

Accordingly, it is an object of the present invention to provide new and unique alternating current supervisory sigalling systems.

It is a more specific object of this invention to provide supervisory signalling systems wherein the supervisory signals are detected using phase and amplitude comparisons rather than frequency filtering.

Yet another object of the invention is to provide supervisory signalling systems wherein a certain coincidence of signals actuates the supervisory signal receiving equipment.

A related object of the invention is to provide supervisory signalling on a multi-frequency two way basis wherein logic circuitry serves to detect the supervisory signals.

According to one aspect of the invention a supervisory signalling circuit connecting a plurality of calling and called voice channels comprises a signal generator common to all channels of the system. A gate circuit at a calling channel is operated to pass the generator signals from the calling channel through an established path to a called channel when supervision is desired. At the called channel a coincidence of supervisory signals simultaneously received over both the completed path and directly from the common supervisory signal generator operates the supervisory signal receiver.

The above mentioned and other objects and features of this invention together with the manner of obtaining them will become more apparent and the invention itself will be best understood by making reference to the following description of preferred embodiments of the invention taken in conjunction with the accompanying drawings, in which:

FIG. 1 shows in logic block form a switching system embodying the invention;

FIG. 1*a* shows in logic block form an alternative detector embodying the invention;

Where possible, simple terms are used and specific items are described hereinafter to facilitate an understanding of the invention; however, the use of such terms and reference to such items are not to act in any manner as a disclaimer of the full range of equivalents which is normally given by the established principles of patent law. To illustrate, the attached drawings show calling and call channels. These could be subscriber stations, trunk circuits or the like. In addition, transistorized circuitry is shown whereas any type of control components, such as vacuum tubes, may be utilized. Quite obviously, other examples could be selected to illustrate the manner in which specific terms have been used and items which have been described are entitled to a wide range of equivalents.

Figure 1:
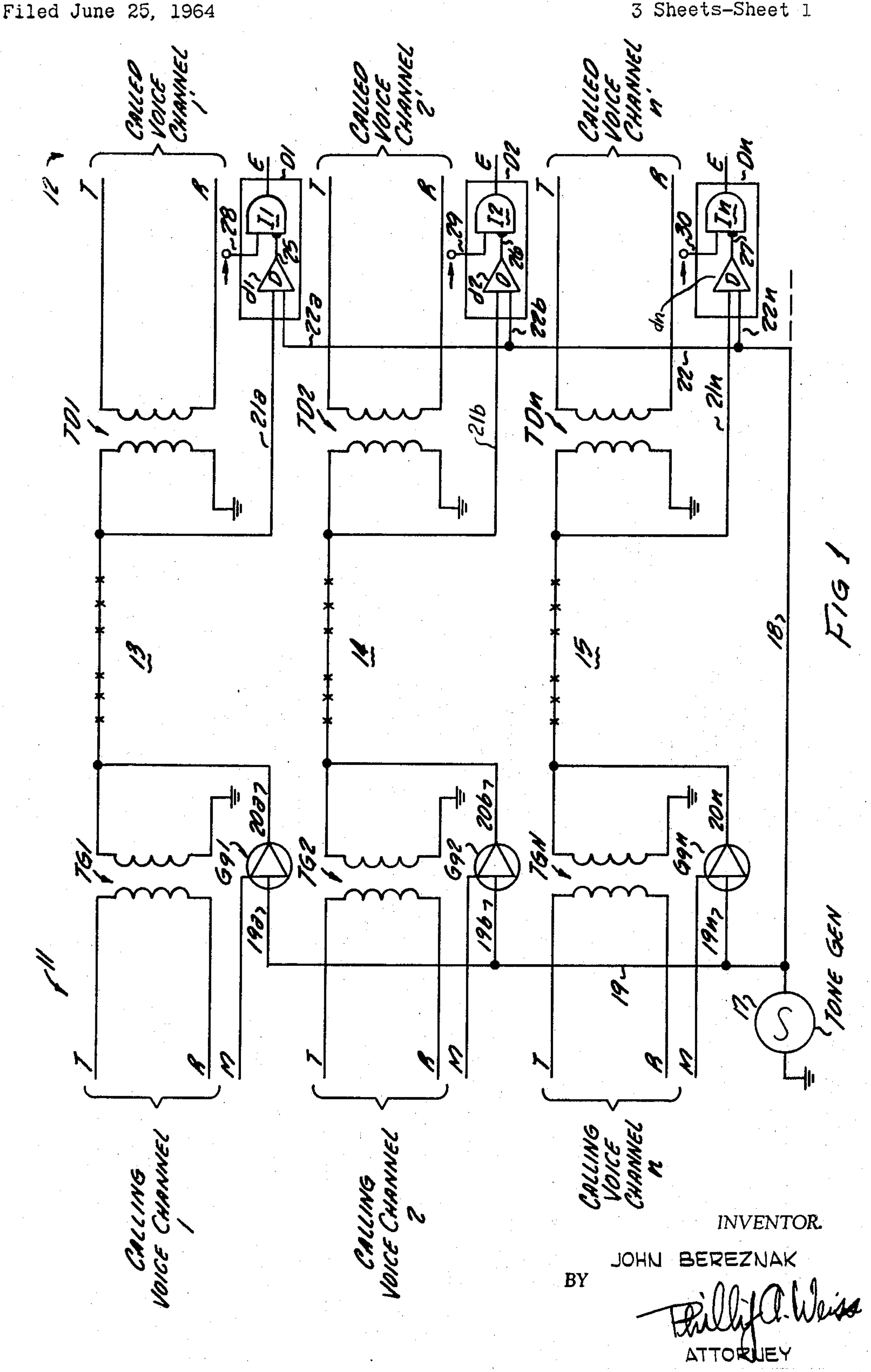

An exemplary telephone system incorporating the principles of the invention used in connection with unbalanced switching equipment is included in FIG. 1. In greater detail, therein is shown a plurality of calling voice channels 11, comprising calling channels 1, 2 to *n*, and a plurality of called voice channels 12 comprising individual called voice channels 1', 2' to *n'*. The calling voice channels 1, 2 to *n* are connected through transformers TG1, TG2 and TG*n* to completed paths 13, 14 and 15 respectively. The completed paths 13, 14 and 15 are connected through transformers TD1, TD2, and TD*n* to called voice channels 1', 2' and *n'* respectively.

The paths may be comprised of switching networks having multi-switches arranged in the primary, secondary and tertiary stages. The multi-switches could be electromechanical devices or the solid states self-seeking matrice type switching elements disclosed in the above mentioned copending application. The X's shown in the paths indicate switched crosspoints. In a similar manner, the voice channels could be subscriber substations or trunks or combinations of substations and trunks.

Individual to each calling channel are shown the well known voice communication tip and ring leads T, R. Also, individual to each calling channel is the well known supervisory lead M.

In the called voice channels are shown the tip and ring leads T, R and the called side supervisory lead designated E in accordance with common usage in the telephone art.

Means common to both the calling and called channels are provided for generating a supervisory signal. In greater detail, tone generator 17 is connected to common bus 18. The common bus is connected to each of the voice channels through conductor 19 and means such as tone gates G*g*1, G*g*2 and G*gn* at the calling side of the noted completed paths 13, 14 and 15 respectively.

The signal on lead 19 is connected to the input of each of the gates G*g*1, G*g*2 and G*gn* through conductors 19*a*, 19*b*, and 19*n* respectively. The gates are controlled by the M leads that are shown connected to each of their respective control inputs. When a signal, such as a keyed instruction, is placed on the M lead connected to a particular gate, that gate is operated and passes the tone signals that are at the input of the gate. The outputs of gates G*g*1, G*g*2 and G*gn* are connected to the completed or established paths 13, 14 and 15 by leads 20*a*, 20*b*, and 20*n* respectively.

Detector means D1, D2 and D*n* are provided at each of the called channels, respectively, for receiving the tone signals and coupling a desired supervisory signal on the E lead, at the called side of the connection. A unique feature of the detector is that it does not use any tuned circuits. Instead, the detector means is comprised of a comparison type coincidence circuit and gate means. The type of comparator circuit used could be regular AND gate means wherein an output signal is obtained responsive to the receipt of two coincident inputs. The inputs would be received over a direct connection to the bus 18 and a connection to the completed path at the called voice channel. The gate means would be operated, responsive to an output received from the AND gate, to pass a signal to the E lead of the called channel.

The coincident comparator circuit and gate circuit combination detectors, as shown in the drawing of FIG. 1, are comprised of difference amplifiers, such as difference amplifiers *d*1, *d*2 and *dn* of detectors D1, D2 and D*n* respectively.

One input to each of the difference amplifiers *d*1, *d*2 and *dn* is obtained from the completed paths 13, 14 and 15 over conductors 21*a*, 21*b* and 21*n* respectively. The other input to the difference amplifiers is obtained from bus 18 over conductor 22 through conductors 22*a*, 22*b* and 22*n* respectively.

In accordance with the well known characteristics of the difference amplifiers *d*1, *d*2 and *dn* an output is obtained when the two inputs are not in phase or are not of substantially equal amplitude. Thus, unless a tone equal to the generated tone from generator 17, both in amplitude and in phase, is passed through a completed path, the difference amplifier in the detector of the called end will provide an output signal. Conversely, when no tone equal in amplitude and phase to the generator 17 tone is received from the calling end through the completed path, the difference amplifier provides an output signal.

The outputs of each of the difference amplifiers *d*1, *d*2 and *dn* is connected to the inhibit control inputs 25, 26 and 27 of inhibit gates I1, I2 and I*n* respectively. A signal at the inputs 28, 29 and 30 of the inhibit gates is gated through the inhibit gates that have no signal at the inhibit control input. That is, whenever a supervisory signal is transmitted through the established path, the associated difference amplifier produces no output. Consequently, there is no inhibit signal on the associated inhibit gates. Accordingly, the inhibit gate passes a signal. The signal passed by the inhibit gate may be equivalent to the M signal, it may be a high level D.C. signal (e.g. teletype signal) or whatever signal is at the input of the inhibit gate.

Thus, when there is no M signal at the calling end, the difference amplifier provides an inhibit signal which prevents the M signal from being transmitted through the inhibit gate to the E lead at the called side of the completed path. On the other hand, when there is an M signal at the calling side, the difference amplifier does not provide an inhibit signal and the M signal is transmitted through the inhibit gate to the E leads. The E and M supervisory signals which can be high level D.C. signals are thus transmitted and received through the completed paths using A.C. signalling methods without the necessity of using complicated and expensive tuned circuitry.

Figures 1A, 2, 3:
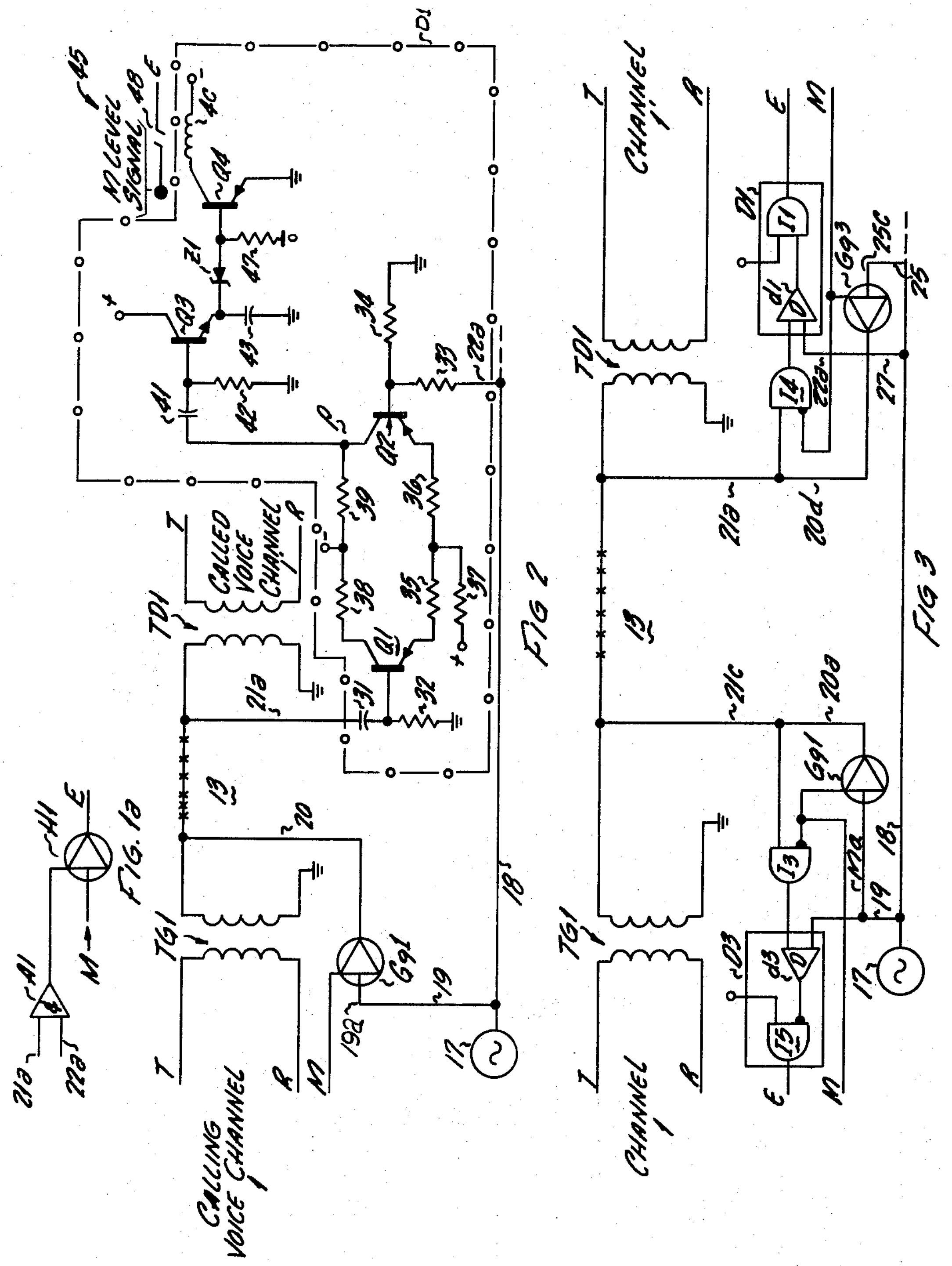
FIG. 2 shows in schematic form details of a preferred embodiment of the circuitry used in the detector of FIG. 1.
FIG. 3 shows in logic block form the inventive supervisory signalling system used for two-way signalling.

In FIG. 1*a* an alternative detector within the scope of this invention is revealed. Therein the difference amplifier is replaced with an AND gate A1 and the inhibit gate is replaced with gate H1. The two inputs to the AND gates received over conductors 21*a*, 22*a* come from the calling end of the completed path and the tone generator bus 18 respectively. If the coincidental equal signals are received at the inputs to the AND gate A1, then the output of the AND gate operates the gate H1 to conduct. When gate H1 conducts the signal at its input, which may be equivalent to the M signal, is connected through to the E lead. If no signal is received through a completed path, such as paths 13, 14 or 15, over conductors 21*a*; then AND gate A1 does not provide an output. Consequently, gate H1 remains in the non-conducting state and no signal is received on conductor E. It should be understood that the AND gate A1 has to be of a type that requires phase as well as amplitude coincidence.

A schematic representation of the difference amplifier embodiment of the supervisory signalling circuit of FIG. 1 is shown in FIG. 2. For purposes of clarity and conciseness only one completed path and associated calling and called channels are shown. Where possible the reference characters of FIG. 1 are used in FIG. 2.

Calling channel is shown connected to called channel 1' over completed path 13. Common signal generator 17 is connected to common bus 18. The signal from generator 17 is coupled to the signal input of gate G*g*1 over leads 19, 19*a*. The M lead at calling channel is connected to the control terminal of gate G*g*1. The output terminal of gate G*g*1 is coupled to the established path 13 through lead 20.

In compliance with the disclosure of FIG. 1, the FIG. 2 drawing shows calling voice channel 1 comprising the well known tip and ring leads T, R. These leads are connected to the established path 13 through means such as transformer TG1. The established path is connected to the tip and ring leads of the called voice channel 1' through transformer TD1.

The detector D1 comprising difference amplifier *d*1 and inhibit gate I1, of FIG. 1 is shown schematically and set off by dot dash lines in FIG. 2. The detector D1 is connected to the completed path 13 through conductor 21 and is connected to the bus 18 through conductor 22*a*. The embodiment of the invention is shown wherein an equivalent M signal is placed on the "E" lead, responsive to the receipt of supervisory signals over the completed path.

The difference amplifier *d*1 is comprised of PNP transistors Q1, Q2. The completed path 13 is connected to the base of the transistor Q1 over lead 21*a* and through a coupling network having a series capacitor 31 and grounded parallel resistor 32. The signal generator is coupled to the base of transistor Q2 through a voltage divider network that is comprised of resistor 33 in series with lead 22*a* and the base terminal, and resistor 34 connected between ground potential and the base terminal.

The PNP transistors Q1, Q2 are part of a symmetrical network. The emitters of both transistors Q1, Q2 are connected to positive battery through emitter resistors 35, 36 respectively, both coupled to the positive battery through a single feed back resistor 37. The values of the resistors are selected so that the feedback resistor 37 is ohmically much larger than the emitter resistors 35, 36. The collectors of both transistors Q1, Q2 are connected to negative battery through equal load resistors 38, 39.

In one preferred embodiment of the difference amplifier components with the following values were used with good results:

| Component designation: | Value |
|---|---|
| 31 | 0.1 μfd. |
| 32 | 10K ohms. |
| 33 | 1.2K ohms. |
| 34 | 10K ohms. |
| 35 | 82 ohms. |
| 36 | 82 ohms. |
| 37 | 3K ohms. |
| 38 | 3K ohms. |
| 39 | 3K ohms. |

The positive and negative batteries were each 12 volts and the tone generator supplied a 25 kc. signal. With these values the gain ratio of the amplifier with a signal supplied to the base of transistor Q1 and with no signal supplied to the base of transistor Q1 was approximately 33 to 1.

Gate means are provided for utilizing the difference amplifier output. In greater detail, the output from the difference amplifier is taken at point P in the collector circuit of transistor Q2 and connected to NPN transistor Q3 through a coupling circuit. The coupling circuit comprises coupling capacitor 41, connected in series between point P and the base terminal of transistor Q3, and resistor 42 connected between the last mentioned base terminal and ground.

The emitter of transistor Q3 is coupled to ground through capacitor 43. The collector of transistor Q3 is connected directly to positive battery. Transistor Q3 in this circuit is normally non-conducting when both transistors Q1, Q2 receive equal signals because the output at point P is then insufficient to cause transistor Q3 to conduct. When transistor Q1 does not receive a signal that is substantially equal to the signal received at transistor Q2, a voltage varying at the frequency rate of the signal received at transistor Q2 is produced at point P. This varying voltage causes transistor Q3 to conduct and a positive voltage to build up in capacitor 43.

Inhibit gate means controlled by the positive voltage in capacitor 43 are provided for passing a signal equivalent to the E lead. This signal, as shown in FIG. 2, can be equal to the M signal used at the calling station.

In greater detail PNP transistor Q4 is provided to control a switching means such as reed relay 45. The collector of transistor Q4 is connected to negative battery through the coil 46 of reed relay 45. The emitter of transistor Q4 is grounded and the base is biased to negative battery through resistor 47.

When transistor Q3 is blocked (when there is a proper signal on transistor Q1) transistor Q4 conducts. Accordingly, normally open contacts 48 of the reed relay 45 are operated to a closed position. Therefore, whatever signal is applied to the input of the reed relay contacts 48 are then connected to the E lead which is coupled to output of reed relay contacts 48.

Diode means, such as zener diode Z1, is used to couple the emitter of transistor Q3 to the base of transistor Q4. Thus, when transistor Q1 does not receive a proper signal, the positive voltage which builds up at the emitter of transistor Q3 exceeds the zener voltage of diode Z1. Then a positive voltage appears at the base of transistor Q4. That transistor is then reversed biased to become nonconductive. Reed relay 45 returns to normal and conductor E is disconnected from any signal source.

Thus, when no M signal is applied to the M lead at the calling channel, gate G*g*1 remains nonconductive. The common generator 17 signal is then prevented from passing through the established path. The only input to the difference amplifier is the signal from common generator

17 appearing at the base of transistor Q2. Since the input to the difference amplifier is unbalanced, a usable signal is produced at point P. The signal at point P causes a positive voltage build-up at the emitter of transistor Q3. This positive voltage breaks over zener diode Z1 to reverse bias transistor Q4, maintaining that transistor in its nonconducting state. With transistor Q4 biased off, relay 45 is in its normal state with its contacts 48 open. The open contacts prevent any supervisory signal from appearing on conductor E.

On the other hand, when a signal is impressed on the M lead at the calling channel 1, gate G*g*1 is operated to conduct. The signal from generator 17 is thereby connected to the established path 13 at the calling channel 1. This signal is transmitted to the base of the transistor Q1 through the established path 13 to called voice channel 1′. Since for practical purposes there is no difference between the input at transistor Q1 and the input at the transistor Q2 no signal is produced at point P. Since no signal is then applied to the base of transistor Q3 no positive voltage builds up at the emitter of that transistor and no reverse biasing voltage is applied to the base of transistor Q4. Accordingly, transistor Q4 saturates and enables current to pass through coil 46 of relay 45. Contacts 48 are operated to the closed position by current flow through the coil. The signal applied at the input of the reed relay contacts is impressed on the E conductor.

Two-way signalling can be implemented using the invention. This is disclosed in connection with the logic diagram of FIG. 3. For purposes of facilitating the explanation of the embodiments of the drawing represented in FIG. 3, only one completed channel is disclosed. It should be understood that a plurality of communication channels, such as shown in FIG. 1, could be similarly implemented. Also, for simplifying the explanation, wherever possible, the same designation characters used in FIGS. 1, 2 are used in FIG. 3.

Common generator means, such as generator 17, connected to common bus 18 is associated with each of the voice channels. Each voice channel is provided with an E and an M conductor in addition to the conductors T, R. The conductors T, R are connected to the completed paths through transformer means, such as transformers TG1, TD1. Means, such as gates G*g*1 and G*g*3 are provided for controlling the application of the generator signal to the voice channels 1 and 1′ respectively. In greater detail, the signal generator 17 output is connected to the signal inputs of gates G*g*1 and G*g*3 through common bus 18, leads 19, **19*a* and leads 25, 25*c*** respectively.

Means, such as inhibit gates I3 and I4, are provided for accomplishing two-way supervisory signal communication over completed path 13 connecting calling channel 1 to called channel 1′. This accomplishment requires means for preventing M signals from producing E signals at the supervisory signal initiating channel. The outputs of gates G*g*1 and G*g*3 are respectively connected to the inhibit gates I3 and I4 and also to voice channels 1, 2 through leads **20*a*, 20*d*. The inhibit inputs of gates I3, I4 are connected to the M leads at the respective voice channels 1, 1′**.

Voice channels 1, 1′ are associated with detector circuits D3, D1 respectively.

The detectors D1, D3 are comprised of coincidental detecting means, such as the difference amplifiers and inhibit gates previously explained. For example, detector D3 comprises difference amplifier *d*3 and inhibit date I5. In a similar manner, detector D1 comprises difference amplifier *d*1 and inhibit gate I1.

When channel 1 is the calling channel, an M signal applied to the M lead operates gate G*g*1 to conduct and inhibit gate I3 is prevented from conducting. Thus, signals, such as the signal from bus 18, conductors 19, **19*a***, and gate G*g*1, are prevented from being transmitted to the detector at channel 1 when an M signal is present at that channel. When no signal is initiated at channel 1, the M signal originating at channel 1 is transmitted through completed path 13, conductor 21c and inhibit gate I3 to detector D3, causing a signal to appear at the E lead of channel 1'. The same type of circuitry functions occurs at called channel 1' when it acts as the initiator and recipient of a supervisory M signal. Then detector D1 is prevented from receiving signals from gate Gg3 by the inhibit action of gate I4 operated responsive to an M inhibit signal originating at the called channel 1'. Thus, the addition of inhibit elements, such as gates I3, I4, suffices to make the inventive concept applicable to two-way supervisory signalling. As will be understood by those skilled in the art full duplex operation can be achieved on a four wire system or by using two separate frequencies.

Figure 4:
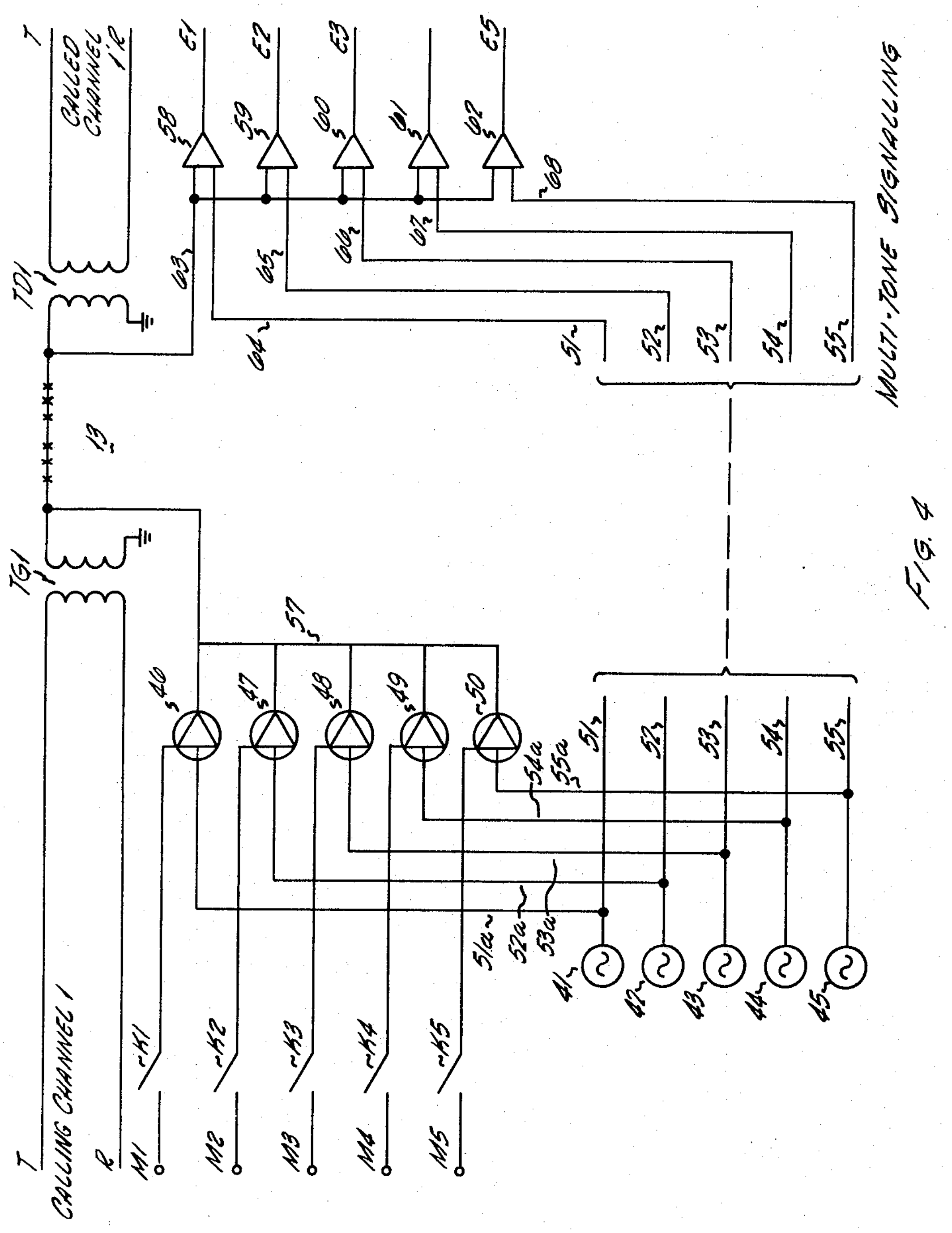
FIG. 4 shows in logic block form the inventive supervisory signalling system using multi-tone signalling.

Means are provided for accomplishing multi-tone signalling using the inventive concept. In greater detail, as shown in FIG. 4, a plurality of common signal generators are provided in association with voice channels and switch paths. For example, if a two-out-of-five signalling system is contemplated, five separate signal generators 41–45 associated with all of the voice channels, such as calling channel 1 and called channel 1' coupled together through established path 13.

In accordance with the invention, means are provided for transmitting the generated signal in a coded manner, such as a two-out-of-five code, responsive to the operation of keys or switches. In greater detail, as shown in FIG. 4, gates 46–50 are operated to conduct responsive to the operation of selected ones of keys K1–K5 whereby selected ones of the gate operating signals M1–M5 are sent to the control terminals of gates 46–50. When the gates conduct, the particular generated frequency of the generators are transmitted to the established path, such as path 13, through the calling voice channel 1. For example, generators 41–45 are connected to buses 51–55 respectively. The buses 51–55 are connected to gates 46–50 through conductors **51*a*–55*a* respectively. Each of the gates are connected to the called voice channel, such as channel 1' through bus 57**.

At the called end, the disclosed detector means are provided for detecting which of the two-out-of-five frequencies have been transmitted. In greater detail, a plurality of detectors, such as detectors 58–62, are provided. The detector circuitry is the same as shown in FIG. 1*a*.

The detectors 58–62 are connected to busses 51–55 respectively through conductors 64–68 respectively. The called channel, such as called channel 1', is connected to the detectors through common conductor 63. When both inputs of any of the detectors 58–62 are coincidentally energized by signals of the same phase and frequency, then an M signal is received for the associated E lead of the E leads E1–E5.

In operation, if two of the keys, such as key K1, K2 are operated, gates 46–47 conduct signals from generators 51, 52 to calling channel 1. The signals are received at the called channel 1' through path 13. Detectors 58 and 59 receive simultaneous signals at both inputs and the E leads E1, E2 are energized.

It should be understood that it is within metes of the invention to use two-way supervisory signalling incorporating multi-tone signalling.

While the principles of the invention have been described above in connection with specific apparatus and applications, it is to be understood that this description is made only by way of example and not as a limitation on the scope of the invention.

I claim:

1. A supervisory signalling circuit for transmitting supervisory signals over completed paths connecting calling voice channels to selected called voice channels comprising tone generator means simultaneously connected to said calling and called voice channels for generating a certain tone, tone gate means operated responsive to said supervisory signals for connecting said tone generator means to a selected one of said completed paths through one of said calling voice channels, and detector means individually connected to said called voice channels and to said tone generator, said detector means operated responsive to simultaneously receiving said certain tone from said tone generator and said selected called voice channel for producing desired supervisory signals at said selected called voice channel.

2. In the circuit of claim 1 wherein said detector means comprises transistorized differential amplifier means having a first and a second transistor, means for coupling the base of said first transistor to said tone generator providing a first input to said amplifier means including means for coupling the base of said transistor to said called voice channel connected to said detector for providing a second input to said amplifier, differential amplifier output means connected to the collector of said first transistor, biasing means in said differential amplifier for supplying a control output signal to said differential amplifier output means only when said input signals differ in amplitude or phase, inhibit gate means in said detector means, supervisory signal output means individually associated with each of said called voice channels, means for coupling desired supervisory signals to said supervisory signal output means through said inhibit gate means, and means for connecting the output of said differential amplifier to operate said inhibit gate means to inhibit the supervisory signal responsive to the control output signal.

3. In the circuit of claim 1 wherein said detector means comprises transistorized differential amplifier means having a first and a second transistor, means for coupling the base of said first transistor to said tone generator providing a first input to said amplifier, means for coupling the base of said second transistor to said called voice channel means connected to said detector providing a first input to said amplifier, differential amplifier output means connected to the collector of said second transistor, means in said differential amplifier for supplying a control output signal to said differential amplifier output means only when said input signals differ in amplitude or phase, inhibit gate means in said detector means, said inhibit gate means comprising reed relay means, said reed relay controlled by third transistor means, means for biasing said third transistor to normally conduct, means for connecting said third transistor in series with the coil of said reed relay, supervisory signal output means individually associated with each of said called voice channel means, means for coupling desired supervisory signals to one side of a normally open contact pair on said reed relay, means for coupling said supervisory signal output means to the other side of said contact pair, and means for connecting the output of said differential amplifier to block said third transistor responsive to the control output signals thereby removing the supervisory signals from said supervisory signal output means responsive to the receipt at said first and second inputs of tones having different amplitudes or phase.

4. A supervisory signalling circuit for transmitting supervisory signals over completed paths connecting calling voice channels to selected called voice channels comprising, tone generator means simultaneously connected to both said calling and called voice channels, tone gate means individually associated with said calling and called voice channels operated responsive to said supervisory signals for connecting tones from said tone generator means to the associated one of said voice channels with which said tone gate is associated, first inhibit gate means individually associated with said calling and called voice channels, said first inhibit gate means operated to inhibit the passage of signals connected thereto responsive to said supervisory signals applied at the one of said channels with which said first inhibit gate means is associated and detector means individually connected to each of said calling and called voice channels through said first inhibit gate means, and to said tone generator operated responsive to simultaneously receiving said tone from said tone generator and from said associated voice channel.

5. In the supervisory signalling circuit of claim 4 wherein said detector means comprises AND gate means, said AND gate means comprising two inputs, a first of said inputs connected directly to said tone generator, a second of said inputs connected to said first inhibit gate means to normally receive therefrom said tones from said associated voice channel over said completed path, means in said AND gate means for providing control output signals responsive to signals having the same amplitudes and phase applied to each of said two inputs, second tone gate means in said detector means, supervisory signal output means associated with each of said called voice channels, means for connecting desired supervisory signals through said tone gate means to said supervisory signal output means, and means in said detector for connecting said AND gate means to operate said tone gate means for transmitting the desired supervisory signals responsive to the control output signal.

6. In the supervisory signalling circuit of claim 4 wherein said detector means comprises differential amplifier means, said differential amplifier means comprising two inputs, a first of said inputs connected directly to said tone generator, a second of said inputs connected to said first inhibit gate means to normally receive therefrom said tones from said associated voice channel over said completed path, means in said differential amplifier means for providing control output signals responsive to signals having different amplitudes or phase applied to each of said two inputs, second inhibit gate means in said detector means, supervisory signal output means associated with each of said called voice channels, means for connecting desired supervisory signals through said second inhibit gate means to said supervisory signal output means, and means in said detector for connecting said difference amplifier means to operate said second inhibit gate means to preclude the transmittal of the supervisory signals responsive to the control output signal.

7. In the circuit of claim 4 wherein said detector means comprises transistorized differential amplifier means having a first and a second transistor, means for coupling the base of said first transistor to said tone generator providing a first input to said amplifier, means for coupling the base of said second transistor to said called voice channel connected to said detector through said first inhibit gate means to normally receive therefrom said tones from said associated voice channel over said completed path for providing a second input to said amplifier, differential amplifier output means connected to the collector of said second transistor biasing means in said differential amplifier for supplying a control output signal at said differential amplifier output means only when said input signals differ in amplitude or phase, second inhibit gate means in said detector means, supervisory signal output means individually associated with each of said called voice channels, means for coupling desired supervisory signals to said supervisory signal output means through said second inhibit gate means and means for connecting the output of said differential amplifier to said second inhibit gate means to operate said second inhibit gate means to inhibit the supervisory signal responsive to the control output signal.

8. In the circuit of claim 4 wherein said detector means comprises transistorized differential amplifier means having a first and a second transistor, means for coupling the base of said first transistor to said tone generator providing a first input to said amplifier, means for coupling the base of said second transistor to said first inhibit gate means to normally receive therefrom said tone from said associated voice channel over said completed path, called voice channel means connected to said detector providing a second input to said amplifier, differential amplifier output means connected to the collector of said second transistor, means in said differential amplifier for supplying a control output signal to said differential amplifier output means only when said input signals differ in amplitude or phase, second inhibit gate means in said detector means, said second inhibit gate means comprising reed relay means, means for biasing said third transistor to normally conduct, means for connecting said third transistor in series with the coil of said reed relay, supervisory signal output means individually associated with each of said voice channel means, means for coupling desired supervisory signals to one side of a normally open contact pair on said reed relay, means for coupling said supervisory signal output means to the other side of said contact pair, and means for connecting the output of said differential amplifier to block said third transistor responsive to the control output signals thereby removing the supervisory signals from said supervisory signal output means responsive to the receipt at said first and second inputs of tones having different amplitudes or phase.

9. A supervisory signalling circuit for transmitting multi-tone supervisory signals over completed paths connecting calling voice channels to selected called voice channels, comprising a group of tone generators simultaneously connected to each of said calling and called voice channels, a group of tone gates connected to each of said calling voice channels, means for individually connecting a different one of said tone generators to each of said tone gates, a plurality of key means associated with each of said channels for selectively operating said tone gates to pass tones from the ones of said tone generators connected through said operated tone gates to said associated calling voice channels, and a group of detector means connected to each of said called voice channels, said detector means operated responsive to simultaneously receiving tones having the same amplitude and phase from said tone generators and from said selected called voice channels to produce multi-tone supervisory signals at said selected called voice channels.

10. In the supervisory signalling circuit of claim 9 wherein each of said detector means comprises AND gate means, said AND gate means comprising two inputs, a first of said inputs connected directly to said tone generators, a second of said inputs connected to said associated called voice channels, means in said AND gate means for providing control output signals responsive to signals having the same amplitude and phase applied to each of said two inputs, second tone gate means in said detector means, supervisory signal output means associated with each of said called voice channels, means for connecting desired supervisory signals through said tone gate means to said supervisory signal output means, and means in said detector for connecting said AND gate means to operate said tone gate means for transmitting the desired supervisory signals responsive to the control output signal.

11. In the supervisory signalling circuit of claim 9 wherein each of said detector means comprises differential amplifier means, said differential amplifier means comprising two inputs, a first of said inputs connected directly to said tone generators, a second of said inputs connected to said associated called voice channels, means in said difference amplifier means for providing control output signals responsive to signals having different amplitudes or phase applied to each of said two inputs, inhibit gate means in said detector means, supervisory signal output means associated with each of said called voice channels, means for connecting desired supervisory signals through said inhibit gate means to said supervisory signal output means, and means in said detector for connecting said differential amplifier means to operate said inhibit means to preclude the transmittal of the desired supervisory signals responsive to the control output signal.

12. In the circuit of claim 9 wherein each of said detector means comprises transistorized differential amplifier means having a first and a second transistor, means for coupling the base of said first transistor to said tone generator providing a first input to said amplifier, means for coupling the base of said second transistor to said called voice channel connected to said detector means providing a second input to said amplifier, differential amplifier output means connected to the collector of said second transistor, biasing means in said differential amplifier for supplying a control signal to said differential amplifier output means only when said input signal differs in amplitude or phase, inhibit gate means in each of said detector means associated with each of said differential amplifier means, supervisory signal output means individually associated with each of said called voice channels, means for coupling desired supervisory signals to said supervisory signal output means through said inhibit gate means, and means for connecting the output of each said differential amplifier to said inhibit gate means to operate said associated inhibit gate means to inhibit the supervisory signal responsive to the control output signal.

13. In the circuit of claim 9 wherein each of said detector means comprises transistorized differential amplifier means having a first and a second transistor, means for coupling the base of said first transistor to one of said tone generators providing a first input to said amplifier, means for coupling the base of said second transistor to said called voice channel means connected to said detector providing a second input to said amplifier, differential amplifier output means connected to the collector of said second transistor, means in said differential amplifier for supplying a control output signal to said differential amplifier output means only when said input signals differ in amplitude or phase, inhibit gate means in said detector means, said inhibit gate means comprising reed relay means, said reed relay controlled by third transistor means, means for biasing said third transistor to normally conduit, means for connecting said third transistor in series with the coil of said reed relay, supervisory signal output means individually associated with each of said called voice channel means, means for coupling desired supervisory signals to one side of a normally open contact pair on said reed relay, means for coupling said supervisory signal output means to the other side of said contact pair, and means for connecting the output of said differential amplifier to block said third transistor responsive to the control output signals thereby removing the supervisory signals from said supervisory signal output means responsive to the receipt at said first and second inputs of tones having different amplitudes or phase.

14. A supervisory signalling circuit for transmitting multi-tone supervisory signals over completed paths connecting calling voice channels to selected called voice channels, comprising a group of tone generators simultaneously to said calling and called voice channels, a group of tone gates connected to each of said voice channels, means for individually connecting a different one of said tone generators to each of said tone gates, a plurality of key means associated with each of said channels for selectively operating said tone gates to pass tones from the ones of said tone generators connected through said operated tone gates to said associated voice channels, a group of inhibit gate means connected to receive signals through said voice channels, and associated with each of said keys operated to inhibit responsive to the operation of said associated key, and a group of detector means connected to the output of said inhibit gate means whereby said detector means is connected to each of said voice channels through one of said inhibit gate means, said detector means operated responsive to simultaneously receiving tones having the same amplitude and phase from said tone generators and from said connected voice channels to produce multi-tone supervisory signals at a selected voice channel other than the voice channel associated with said operated key means.

15. A supervisory signalling circuit for transmitting supervisory signals over completed paths connecting calling voice channels to selected called voice channels, comprising tone generator means simultaneously connected to said calling and called voice channels, first tone gate means operated responsive to said supervisory signals for connecting said tone generator means to a selected one of said completed paths through one of said calling voice channels, detector means individually associated with each of said called voice channels, said detector means comprising differential amplifier means, said differential amplifier comprising two inputs, a first of said inputs connected directly to said tone generator, a second of said inputs connected to said associated called voice channels, means in said differential amplifier for providing a control output signal responsive to signals of different amplitude or phase applied to each of said two inputs, inhibit means in said detection means, supervisory signal output means associated with each of said called voice channels, means for connecting desired supervisory signals through said inhibit means to said supervisory signal output means and means in said detector for connecting said difference amplifier to said inhibit means to inhibit the supervisory signal response to the control output signal.

16. A supervisory signalling circuit for transmitting supervisory signals over completed paths connecting calling voice channels to selected called voice channel comprising tone generator means simultaneously connected to said calling and called voice channels, first tone gate means operated responsive to said supervisory signals for connecting said tone generator means to a selected one of said completed paths through one of said calling voice channels, detector means individually associated with each of said called voice channels, said detector means comprising AND gate means, said AND gate means comprising two inputs, a first of said inputs connected directly to said tone generator, a second of said inputs connected to said associated called voice channels, means in said AND gate means for providing a control output signal responsive to signals having the same amplitude and phase applied to each of said two inputs, second tone gate means in said detector means, supervisory signal output means associated with each of said called voice channels, means for connecting desired supervisory signals through said second tone gate means to said supervisory signal output means, and means in said detector for connecting said AND gate means to operate said tone gate means for transmitting the supervisory signal responsive to the control output signal.

References Cited

UNITED STATES PATENTS

| | | | |
|---|---|---|---|
| 3,146,314 | 8/1964 | Boehly et al. | 179—84 |
| 3,164,679 | 1/1965 | Read | 179—16.4 |
| 3,205,312 | 9/1965 | Brightman et al. | 179—18.9 |

KATHLEEN H. CLAFFY, *Primary Examiner.*

L. A. WRIGHT, *Assistant Examiner.*